(12) United States Patent
Lu

(10) Patent No.: US 6,942,190 B1
(45) Date of Patent: Sep. 13, 2005

(54) SUCKER ASSEMBLY

(76) Inventor: Tung Hsien Lu, No. 289, Peng Yi Rd., Tai Ping City, Taichung (TW), 411

(*) Notice: Subject to any disclaimer, the term of this patent is extended or adjusted under 35 U.S.C. 154(b) by 0 days.

(21) Appl. No.: 10/421,745

(22) Filed: Apr. 24, 2003

(51) Int. Cl.[7] .................................. F16B 47/00
(52) U.S. Cl. .................. 248/309.3; 248/205.5; 248/205.7; 248/206.2; 248/205.8
(58) Field of Search .................. 248/205.5, 205.6, 248/205.7, 205.8, 205.9, 206.1, 206.2, 363, 683, 251, 309.3; 211/105.1, 105.2, 16, 87, 123, 7

(56) References Cited

U.S. PATENT DOCUMENTS

| | | | | |
|---|---|---|---|---|
| 4,133,575 A | * | 1/1979 | Mader | 296/95.1 |
| 5,065,973 A | * | 11/1991 | Wang | 248/362 |
| 5,423,466 A | * | 6/1995 | Moon | 224/324 |
| 5,970,860 A | * | 10/1999 | Yip | 99/510 |
| 6,193,197 B1 | * | 2/2001 | Lian | 248/206.2 |
| 6,502,794 B1 | * | 1/2003 | Ting | 248/206.2 |

FOREIGN PATENT DOCUMENTS

| | | | |
|---|---|---|---|
| JP | 11-146843 | * | 6/1999 |
| JP | 11-290585 | * | 10/1999 |
| JP | 2001-214484 A | * | 8/2001 |

* cited by examiner

*Primary Examiner*—Gwendolyn Baxter
(74) *Attorney, Agent, or Firm*—Charles E. Baxley

(57) ABSTRACT

A sucker assembly includes a sucker, a clamping unit, a housing, and an adjusting rotation cover. Thus, the sucker assembly that can be fixed on the wall rapidly and conveniently, thereby facilitating the user operating the sucker assembly. In addition, the sucker assembly can be used to suspend a hanging rod which has two ends each pressed by the press member of the clamping unit, so that the hanging rod is positioned by the sucker assembly, thereby preventing the hanging rod from detaching from the sucker assembly during the working process.

12 Claims, 6 Drawing Sheets

SUCKER ASSEMBLY

BACKGROUND OF THE INVENTION

1. Field of the Invention

The present invention relates to a sucker assembly, and more particularly to a sucker assembly that can be fixed on the wall rapidly and conveniently, thereby facilitating the user operating the sucker assembly.

2. Description of the Related Art

A conventional fixing device comprises two suckers attached on the wall, and a hanging rod mounted between the two suckers. Thus, the conventional fixing device can be used in the toilet for hanging an article, such as the towel or the like. However, the suckers are easily detached from the wall during a long-term utilization, thereby causing inconvenience to the user.

SUMMARY OF THE INVENTION

The primary objective of the present invention is to provide a sucker assembly that can be fixed on the wall rapidly and conveniently, thereby facilitating the user operating the sucker assembly.

Another objective of the present invention is to provide a sucker assembly, wherein the sucker assembly can be used to suspend a hanging rod which has two ends each extended through the two through holes of the housing and the through hole of the mounting member and each pressed by the press member of the clamping unit, so that the hanging rod is positioned by the sucker assembly, thereby preventing the hanging rod from detaching from the sucker assembly during displacement of the sucker assembly.

A further objective of the present invention is to provide a sucker assembly, wherein the adjusting rotation cover is located at the top end, so that when the worker is operating the adjusting rotation cover, the housing and the hanging rod will not interfere with the worker's operation, thereby facilitating the worker's operation.

In accordance with the present invention, there is provided a sucker assembly, comprising a sucker, a clamping unit, a housing, and an adjusting rotation cover, wherein:

the sucker is formed with a protruding post;

the clamping unit is mounted on the sucker and includes a mounting member having a first end formed with a hollow tube secured on the protruding post of the sucker and a second end formed with a threaded rod, the mounting member has a mediate portion formed with a through hole;

the housing is mounted on the clamping unit and the sucker and has a periphery formed with two radially opposite through holes aligning with the through hole of the mounting member; and the adjusting rotation cover is mounted on the mounting member of the clamping unit and can be rotated to press the housing and the mounting member of the clamping unit to move toward the sucker.

Further benefits and advantages of the present invention will become apparent after a careful reading of the detailed description with appropriate reference to the accompanying drawings.

DETAILED DESCRIPTION OF THE INVENTION

Figure 1:
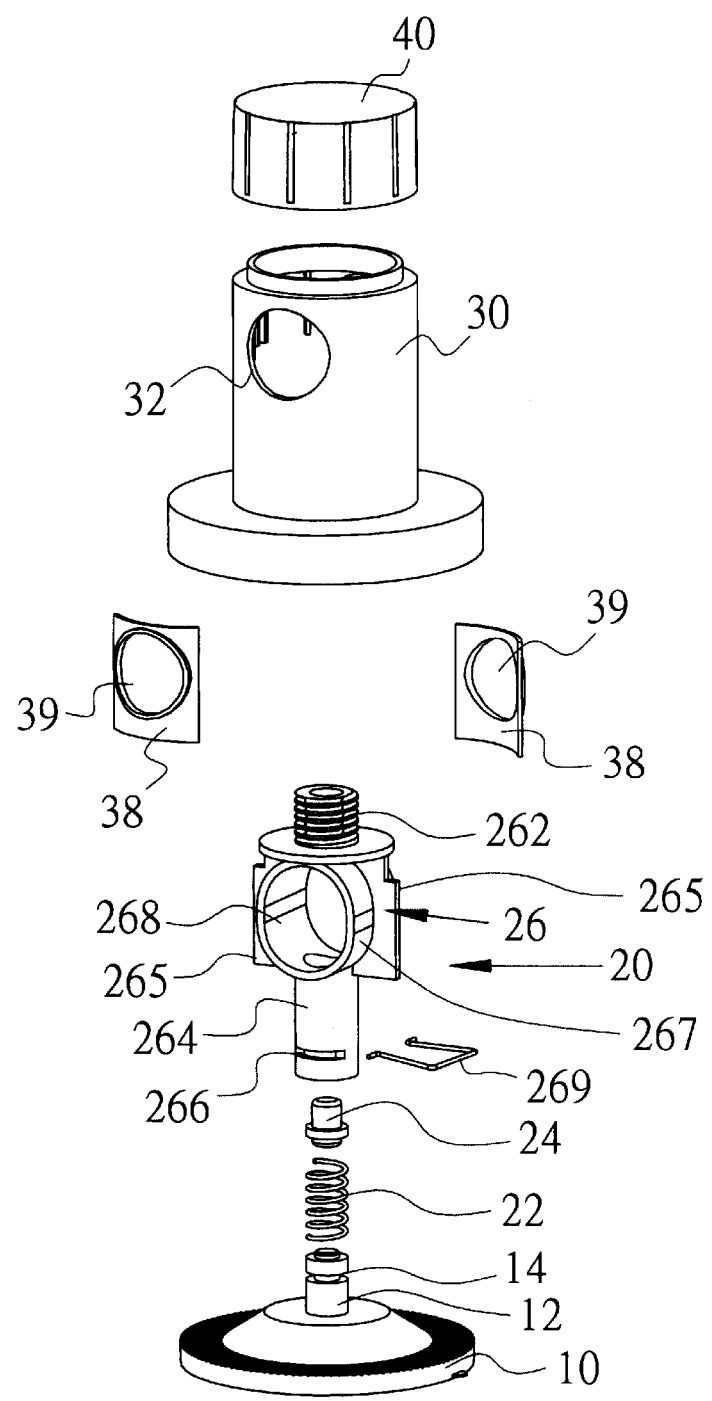
FIG. 1 is an exploded perspective view of a sucker assembly in accordance with the preferred embodiment of the present invention.
Figure 2:
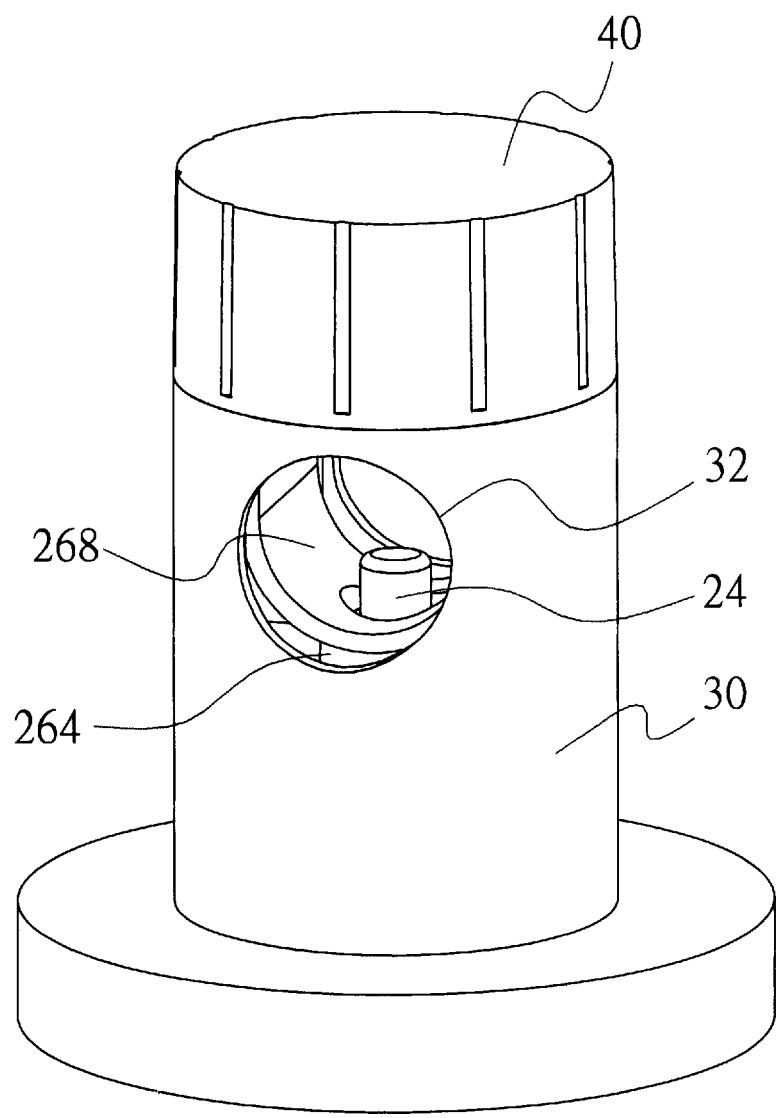
FIG. 2 is a perspective assembly view of the sucker assembly in accordance with the preferred embodiment of the present invention.
Figure 3:
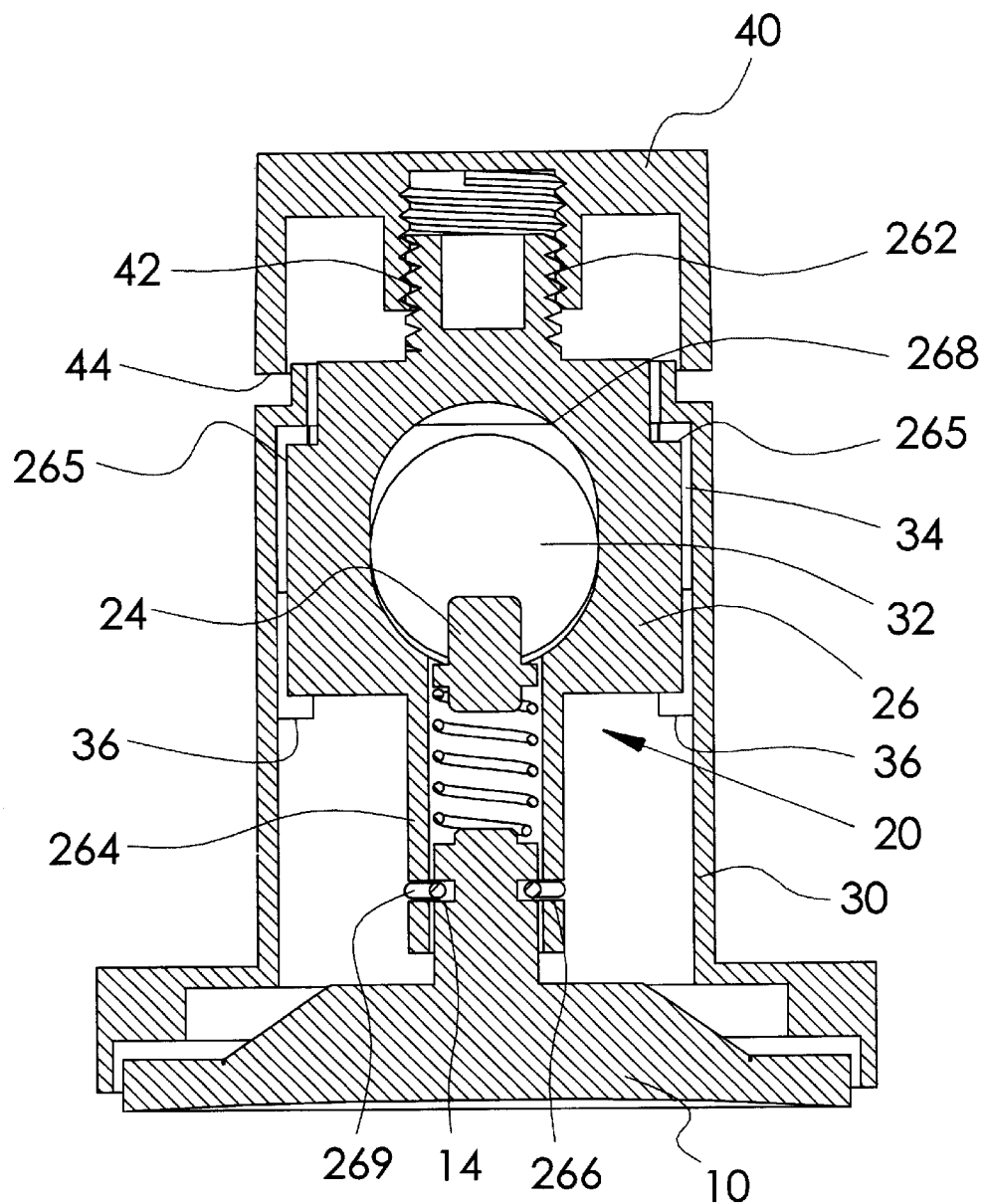
FIG. 3 is a front plan cross-sectional view of the sucker assembly as shown in FIG. 2.

Referring to the drawings and initially to FIGS. 1–3, a sucker assembly in accordance with the preferred embodiment of the present invention comprises a sucker 10, a clamping unit 20, a housing 30, and an adjusting rotation cover 40.

The sucker 10 has a center having a protruding surface. The sucker 10 is formed with a protruding post 12 having an outer wall formed with an annular locking groove 14.

The clamping unit 20 is mounted on the sucker 10 and includes a mounting member 26 having a first end formed with a hollow tube 264 secured on the protruding post 12 of the sucker 10 and a second end formed with a threaded rod 262. The hollow tube 264 of the mounting member 26 has a wall formed with a slit 266 aligning with the locking groove 14 of the protruding post 12. The clamping unit 20 further includes a snap member 269 extended through the slit 266 of the hollow tube 264 and snapped into the locking groove 14 of the protruding post 12, thereby securing the hollow tube 264 on the protruding post 12, so that the clamping unit 20 is combined with the sucker 10. The mounting member 26 of the clamping unit 20 has a mediate portion formed with a protruding ring portion 267 formed with a through hole 268 communicating with the hollow tube 264. The mediate portion of the mounting member 26 of the clamping unit 20 has two sides each formed with a flat edge 265.

The clamping unit 20 further includes a spring 22 mounted in the hollow tube 264 and having a first end secured on the protruding post 12 of the sucker 10, and a press member 24 mounted in the hollow tube 264 and having a first end secured on a second end of the spring 22 and a second end extended into the through hole 268 of the mounting member 26.

Figure 6:
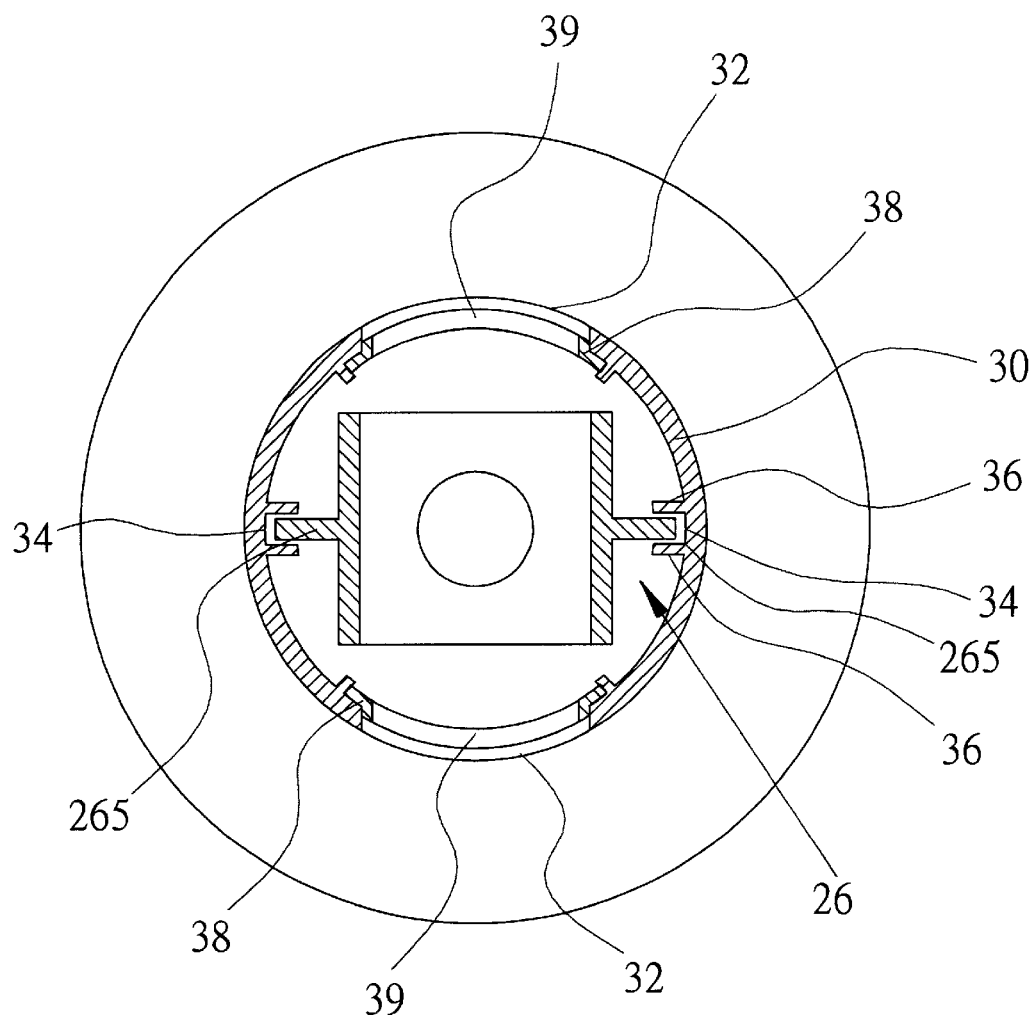
FIG. 6 is a top plan cross-sectional view of the sucker assembly as shown in FIG. 2.

Referring to FIG. 6 with reference to FIGS. 1–3, the housing 30 is a hollow tube and is mounted on the clamping unit 20 and the sucker 10. Preferably, the threaded rod 262 of the mounting member 26 is protruded outward from the housing 30. The housing 30 has a periphery formed with two radially opposite through holes 32 aligning with the through hole 268 of the mounting member 26. The housing 30 has an inner wall formed with two radially opposite guide tracks 34, and the flat edge 265 of the mounting member 26 of the clamping unit 20 is mounted in the respective guide track 34 of the housing 30, thereby positioning the clamping unit 20 on the housing 30. Preferably, each of the two guide tracks 34 of the housing 30 is formed by two spaced ribs 36. In addition, each of the two guide tracks 34 of the housing 30 is located between the two through holes 32 of the housing 30.

The sucker assembly further comprises two gaskets 38 each mounted in the inner wall of the housing 30 and each formed with a through hole 39 aligning with the respective through hole 32 of the housing 30.

The adjusting rotation cover 40 is mounted on the mounting member 26 of the clamping unit 20 and is formed with an inner thread 42 screwed on the threaded rod 262 of the mounting member 26. In addition, the adjusting rotation cover 40 has an end 44 that can be rested on the housing 30 after displacement of the adjusting rotation cover 40.

Figure 4:
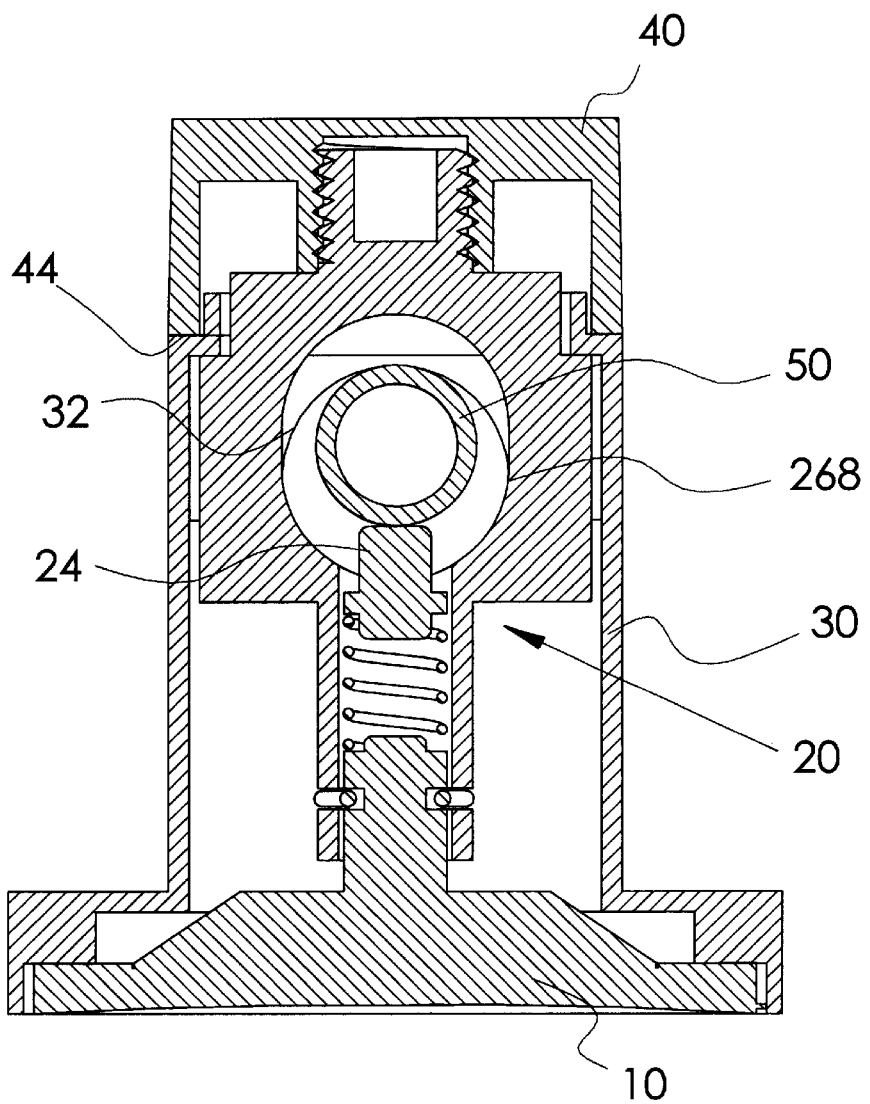
FIG. 4 is a schematic operational view of the sucker assembly as shown in FIG. 3 in use.

In operation, referring to FIG. 4 with reference to FIGS. 1–3, the sucker 10 is initially placed on the wall. Then, the adjusting rotation cover 40 is rotated to move toward the sucker 10. When the adjusting rotation cover 40 is moved toward the sucker 10, the adjusting rotation cover 40 can press the housing 30 and the mounting member 26 of the clamping unit 20 to move toward the sucker 10, so that the housing 30 and the clamping unit 20 can drive the sucker 10 to deform and distort, thereby closely attaching the sucker 10 on the wall.

Figure 5:
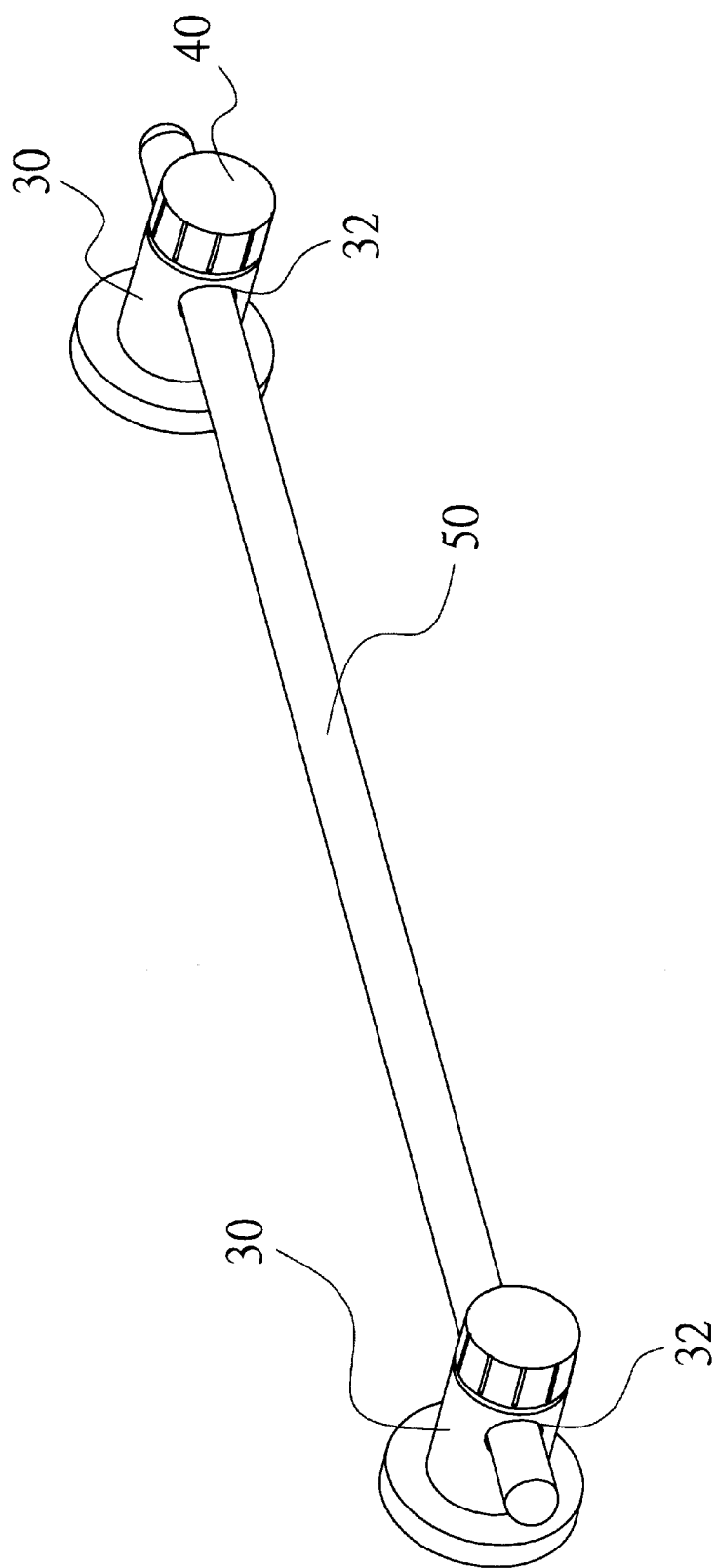
FIG. 5 is a schematic perspective view showing the sucker assembly being used for hanging a hanging rod.

In practice, referring to FIG. 5 with reference to FIGS. 1–4, two sucker assemblies are mounted on a hanging rod 50 which has two ends each extended through the two through holes 32 of the housing 30 and the through hole 268 of the mounting member 26 and each pressed by the press member 24 of the clamping unit 20, so that the hanging rod is positioned by the sucker assembly, thereby preventing the hanging rod 50 from detaching from the sucker assembly during displacement of the sucker assembly. In addition, the adjusting rotation cover 40 is located at the top end, so that when the worker is operating the adjusting rotation cover 40, the housing 30 and the hanging rod 50 will not interfere with the worker's operation, thereby facilitating the worker's operation.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A sucker assembly, comprising a sucker, a clamping unit, a housing, and an adjusting rotation cover, wherein:
   the sucker is formed with a protruding post;
   the clamping unit is mounted on the sucker and includes a mounting member having a first end formed with a hollow tube secured on the protruding post of the sucker and a second end formed with a threaded rod, the mounting member has a mediate portion formed with a through hole;
   the housing is mounted on the clamping unit and the sucker and has a periphery formed with two radially opposite through holes aligning with the through hole of the mounting member; and
   the adjusting rotation cover is mounted on the mounting member of the clamping unit and can be rotated to press the housing and the mounting member of the clamping unit to move toward the sucker.

2. The sucker assembly in accordance with claim 1, wherein the protruding post of the sucker has an outer wall formed with an annular locking groove, the hollow tube of the mounting member has a wall formed with a slit aligning with the locking groove of the protruding post, and the clamping unit further includes a snap member extended through the slit of the hollow tube and snapped into the locking groove of the protruding post, thereby securing the hollow tube on the protruding post, so that the clamping unit is combined with the sucker.

3. The sucker assembly in accordance with claim 1, wherein the mediate portion of the mounting member of the clamping unit is formed with a protruding ring portion formed with the through hole.

4. The sucker assembly in accordance with claim 1, wherein the through hole of the mounting member of the clamping unit communicates with the hollow tube.

5. The sucker assembly in accordance with claim 1, wherein the clamping unit further includes a spring mounted in the hollow tube and having a first end secured on the protruding post of the sucker, and a press member mounted in the hollow tube and having a first end secured on a second end of the spring and a second end extended into the through hole of the mounting member.

6. The sucker assembly in accordance with claim 1, wherein the housing has an inner wall formed with two radially opposite guide tracks, and the mediate portion of the mounting member of the clamping unit has two sides each formed with a flat edge mounted in the respective guide track of the housing, thereby positioning the clamping unit on the housing.

7. The sucker assembly in accordance with claim 6, wherein each of the two guide tracks of the housing is formed by two spaced ribs.

8. The sucker assembly in accordance with claim 6, wherein each of the two guide tracks of the housing is located between the two through holes of the housing.

9. The sucker assembly in accordance with claim 1, wherein the threaded rod of the mounting member is protruded outward from the housing.

10. The sucker assembly in accordance with claim 1, further comprising two gaskets each mounted in the inner wall of the housing and each formed with a through hole aligning with the respective through hole of the housing.

11. The sucker assembly in accordance with claim 1, wherein the adjusting rotation cover is formed with an inner thread screwed on the threaded rod of the mounting member.

12. The sucker assembly in accordance with claim 1 wherein the adjusting rotation cover has an end that can be rested on the housing after displacement of the adjusting rotation cover.

* * * * *